US012534687B2

(12) United States Patent
Herzberger et al.

(10) Patent No.: US 12,534,687 B2
(45) **Date of Patent: *Jan. 27, 2026**

(54) LAUNDRY DETERGENT COMPOSITION COMPRISING POLYVINYL ALCOHOL ACETAL POLYMER

(71) Applicant: The Procter & Gamble Company, Cincinnati, OH (US)

(72) Inventors: Jana Verena Margarethe Herzberger, Florence, KY (US); Kathleen Mary Mcdonough, Mason, OH (US); Kristine Lynn Niehaus, Harrison, OH (US); Pieter Jan Maria Saveyn, Destelbergen (BE); Mark Robert Sivik, Mason, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 286 days.

This patent is subject to a terminal disclaimer.

(21) Appl. No.: 18/297,125

(22) Filed: Apr. 7, 2023

(65) Prior Publication Data

US 2023/0279314 A1 Sep. 7, 2023

Related U.S. Application Data

(63) Continuation of application No. PCT/US2021/055704, filed on Oct. 20, 2021.

(30) Foreign Application Priority Data

Oct. 23, 2020 (EP) .................................... 20203485

(51) Int. Cl.

| | |
|---|---|
| ***C11D 1/94*** | (2006.01) |
| ***C11D 1/14*** | (2006.01) |
| ***C11D 1/22*** | (2006.01) |
| ***C11D 1/75*** | (2006.01) |
| ***C11D 3/37*** | (2006.01) |
| *C11D 1/29* | (2006.01) |
| *C11D 1/72* | (2006.01) |
| *C11D 1/88* | (2006.01) |

(52) U.S. Cl.

CPC .................. *C11D 1/94* (2013.01); *C11D 1/14* (2013.01); *C11D 1/22* (2013.01); *C11D 1/75* (2013.01); *C11D 3/37* (2013.01); *C11D 3/3753* (2013.01); *C11D 1/29* (2013.01); *C11D 1/72* (2013.01); *C11D 1/88* (2013.01); *C11D 2111/14* (2024.01)

(58) Field of Classification Search

CPC .... C11D 1/94; C11D 1/14; C11D 1/22; C11D 1/75; C11D 3/37; C11D 3/3753; C11D 2111/1488; C11D 1/29; C11D 1/72

USPC .......................................................... 510/276

See application file for complete search history.

(56) References Cited

U.S. PATENT DOCUMENTS

| | | | | |
|---|---|---|---|---|
| 5,330,675 | A | 7/1994 | Kroner et al. | |
| 5,466,762 | A | 11/1995 | Kroner et al. | |
| 11,898,121 | B2 * | 2/2024 | Herzberger | C11D 1/94 |
| 2016/0024441 | A1 | 1/2016 | Cosgrove et al. | |
| 2017/0218315 | A1 * | 8/2017 | Rasmussen | C11D 17/06 |
| 2022/0127548 | A1 | 4/2022 | Herzberger et al. | |

FOREIGN PATENT DOCUMENTS

| | | | |
|---|---|---|---|
| EP | 3456805 | A1 | 3/2019 |
| GB | 1073462 | A | 6/1967 |
| WO | 2018003683 | A1 | 1/2018 |

OTHER PUBLICATIONS

All Office Actions; U.S. Appl. No. 17/505,675, filed Oct. 20, 2021.
PCT Search Report and Written Opinion for PCT/US2021/055704 dated Jan. 12, 2022, 13 pages.

* cited by examiner

*Primary Examiner* — Heidi R Kelley

(74) *Attorney, Agent, or Firm* — Abigail O. Idokogi; Andrew J. Mueller; Carrie Schwartz

(57) ABSTRACT

A laundry detergent composition can include a detersive surfactant and a polyvinyl acetal polymer having a structure including the structural units (I), (II) and (III):

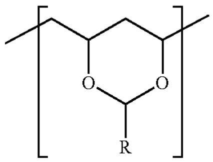

(I)

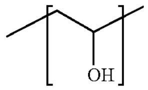

(II)

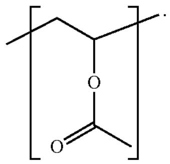

(III)

13 Claims, No Drawings

LAUNDRY DETERGENT COMPOSITION COMPRISING POLYVINYL ALCOHOL ACETAL POLYMER

FIELD OF THE INVENTION

The present application relates to laundry detergent compositions comprising polyvinyl alcohol acetal polymer.

BACKGROUND OF THE INVENTION

Laundry detergent formulators include polymers in the detergent composition to improve the cleaning performance of the detergent, such as the whiteness performance. There have been recent trends to find more environmentally friendly polymers that can be formulated in laundry detergent compositions and that provide good cleaning performance, such as whiteness performance.

Environmentally friendly polymers that have good biodegradability are particularly desired.

The inventors have found that laundry detergent compositions comprising specific polyvinyl alcohol acetal polymers exhibit good cleaning performance, such as whiteness performance, and are environmentally friendly and have a good biodegradability profile.

SUMMARY OF THE INVENTION

Included herein, for example, is a laundry detergent composition comprising:

(a) from 5.0 wt % to 60 wt % detersive surfactant; and (b) from 0.05 wt % to 8.0 wt % polyvinyl alcohol acetal polymer, wherein the polyvinyl alcohol acetal polymer has a structure comprising the structural units (I), (II) and (III):

(I)

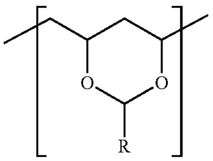

(II)

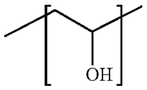

(III)

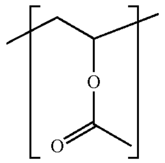

wherein R is selected from alkyl, alkenyl, hydroxyalkyl, hydroxyalkenyl, aryl, alkyl aryl, alkenyl aryl, aryl alkyl, aryl alkenyl, and any derivative thereof.

DETAILED DESCRIPTION OF THE INVENTION

The laundry detergent composition comprises:

(a) from 5.0 wt % to 60 wt % detersive surfactant; and (b) from 0.05 wt % to 8.0 wt % polyvinyl alcohol acetal polymer, wherein the polyvinyl alcohol acetal polymer has a structure comprising the structural units (I), (II) and (III):

(I)

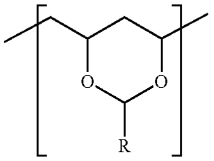

(II)

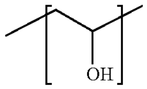

(III)

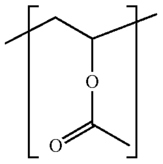

wherein R is selected from alkyl, alkenyl, hydroxyalkyl, hydroxyalkenyl, aryl, alkyl aryl, alkenyl aryl, aryl alkyl, aryl alkenyl, and any derivative thereof.

Preferably, R is selected from alkyl, alkenyl, hydroxyalkyl, hydroxyalkenyl, phenyl, alkyl phenyl, alkenyl phenyl, phenyl alkyl, phenyl alkenyl, and any derivative thereof.

Preferably, the composition comprises from 0.1 wt % to 5.0 wt %, or from 0.1 wt % to 3.5 wt % polyvinyl alcohol acetal polymer.

Preferably, the composition comprises from 10 wt % to 40 wt % detersive surfactant.

Suitable laundry detergent compositions include laundry detergent powder compositions, laundry detergent liquid compositions, laundry detergent gel compositions, and water-soluble laundry detergent compositions.

Polyvinyl alcohol acetal polymer: The polyvinyl alcohol acetal polymer has a structure comprising the structural units (I), (II) and (III):

(I)

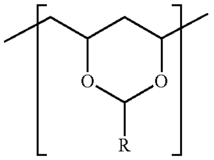

(II)

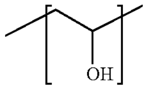

(III)

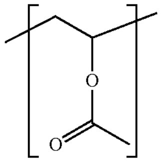

wherein R is selected from alkyl, alkenyl, hydroxyalkyl, hydroxyalkenyl, aryl, alkyl aryl, alkenyl aryl, aryl alkyl, aryl alkenyl, and any derivative thereof.

Preferably, R is selected from alkyl, alkenyl, hydroxyalkyl, hydroxyalkenyl, phenyl, alkyl phenyl, alkenyl phenyl, phenyl alkyl, phenyl alkenyl, and any derivative thereof.

The polyvinyl alcohol acetal polymer may have a structure that consists essentially only of the structural units (I), (II) and (III).

It may be preferred for the polyvinyl alcohol acetal polymer to have the structure such that R is alkyl or a derivative thereof.

It may be preferred for the polyvinyl alcohol acetal polymer to have the structure such that R is aryl or a derivative thereof.

It may be preferred for the polyvinyl alcohol acetal polymer to have the structure such that R is phenyl or a derivative thereof.

It may be preferred for the polyvinyl alcohol acetal polymer to have a structure such that R is substituted with a functional group comprising a heteroatom. The functional group may be a heteroatom. Preferred functional groups comprising a heteroatom are selected from F, Cl, Br, I, —OH, —$NR^{12}$, —O—$R^1$, —C(═O)H, —C(═O)—O—$R^1$, —C(═O)—NH—$R^1$, wherein each $R^1$ is independently selected from H, linear or branched $C_1$-$C_{20}$ alkyl.

The properties of the polyvinyl alcohol acetal polymer are largely governed by the degree of acetate substitution, the degree of hydroxyl substitution and degree of acetal substitution. It is believed that the degree of acetate substitution, the degree of hydroxyl substitution and degree of acetal substitution provide the right balance between improving wash performance in the presence of greasy soils, while still being able to create stable aqueous polymer solutions to facilitate manufacturing.

Preferably, the polyvinyl alcohol acetal polymer has an average degree of acetal substitution expressed as mol % of from 0.5% to 10%, preferably from 0.75% to 5.0%, more preferably from 1.0% to 2.5%. The degree of acetal substitution can be determined using $^1$H-NMR spectroscopy.

Preferably, the polyvinyl alcohol acetal polymer has an average degree of acetate substitution expressed as mol % of from 5% to 25%. The degree of acetate substitution can be determined using $^1$H-NMR spectroscopy.

Preferably, the polyvinyl alcohol acetal polymer has an average degree of hydroxyl substitution expressed as mol % of from 60% to 95%, or from 70% to 95%. The degree of hydroxyl substitution can be determined using $^1$H-NMR spectroscopy.

The properties of the polyvinyl alcohol acetal polymer can also be governed by the molecular weight. The molecular weight of the polyvinyl alcohol acetal polymer can be expressed as a viscosity. The polyvinyl alcohol acetal polymer can have an average viscosity of from 1 mPa·s to 100 mPa·s, when measured as a 4% aqueous solution in demineralised water at 20° C. The viscosity of the freshly made polyvinyl alcohol acetal polymer aqueous solution is typically measured using a Brookfield LV type viscometer with UL adapter as described in British Standard EN ISO 15023-2:2006 Annex E Brookfield Test method. The polyvinyl alcohol acetal polymer can have an average viscosity of from 1 mPa·s to 100 mPas, preferably from 1 mPa·s to 25 mPa·s preferably of from 1 mPa·s to 15 mPa·s, more preferably of from 1 mPa·s to 10 mPa·s, most preferably of from 1 to 5 mPa·s.

It is preferred that R within structure of the polyvinyl alcohol acetal polymer represents a $C_1$ to $C_{11}$ alkyl, more preferably a $C_3$ to $C_9$ alkyl, most preferably a $C_5$ to $C_7$ alkyl. The $C_1$ to $C_{11}$ alkyl R group can be linear or branched, substituted or unsubstituted.

It is preferred that R is selected from phenyl, alkyl phenyl, phenyl alkyl or a derivative thereof. It is more preferred that R is an aryl or a derivative thereof. It is more preferred that R is a phenyl or a derivative thereof.

When R in structure unit (I) is a phenyl, structure unit (I) can be represented by structure (IV):

(IV)

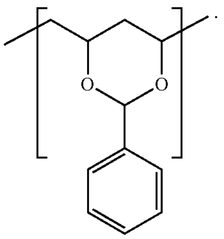

When R in structure unit (I) is an alkyl phenyl, structure unit (I) can be represented by structure (V):

(V)

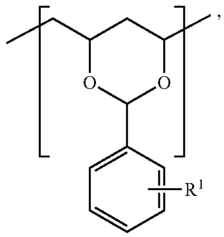

wherein, $R^1$ in structure (V) is one or more independently selected from linear or branched, substituted or unsubstituted $C_1$-$C_{20}$ alkyl.

When R in structure unit (I) is a phenyl alkyl, structure unit (I) can be represented by structure (VI):

(VI)

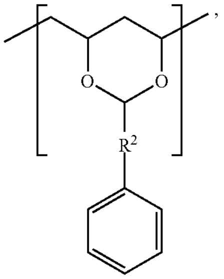

wherein, $R^2$ in structure (VI) is selected from linear or branched, substituted or unsubstituted $C_1$-$C_{20}$ alkylene, preferably selected from —$CH_2$— (methylene) and —$CH_2$—$CH_2$— (ethylene).

It is possible that the phenyl, alkyl phenyl or phenyl alkyl of structure unit (I) can be further substituted by a functional group comprising a heteroatom. This functional group may be a heteroatom. Preferred functional groups comprising a heteroatom are selected from F, Cl, Br, I, —OH, —$NR^{12}$, —O—$R^1$, —C(═O)H, —C(═O)—O—$R^1$, —C(═O)—NH—$R^1$, wherein each $R^1$ is independently selected from H, linear or branched $C_1$-$C_{20}$ alkyl.

It may be preferred that the polyvinyl alcohol acetal polymer has more than one type of R substitution. For example, the polyvinyl alcohol acetal polymer may have part of its R substitution being $C_5$ alkyl, and part of its R substitution being N,N-dimethylpropylamine. For example, the polyvinyl alcohol acetal polymer may have part of its R substitution being $C_5$ alkyl, and part of its R substitution being a phenyl. For example, the polyvinyl alcohol acetal polymer may its R group being two or more types of different alkyl.

Preferably, the structural unit (I) of the polyvinyl alcohol acetal polymer is derived from one or more selected from butyraldehyde, hexanal, benzaldehyde, 2-ethyl hexanal and 2-propyl heptanal.

The molar ratios of structural units (I). (II) and (III) will be defined by the degree of acetal substitution, degree of acetate substitution and degree of hydroxyl substitution. The structural units (I), (II) and (III) can be randomly or block distributed, preferably randomly distributed. These polyvinyl alcohol acetal polymers can be produced through a condensation reaction of polyvinyl alcohol and the corresponding aldehyde or acetal.

A suitable polyvinyl alcohol acetal polymer comprises structure units (I), (II) and (III) as shown in structure 3:

(Structure 3)

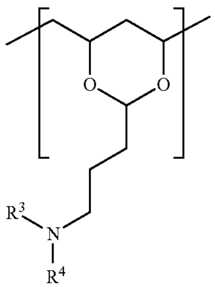

(I)

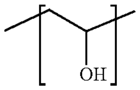

(II)

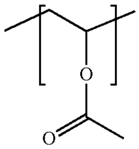

, (III)

wherein each $R^3$ and $R^4$ are independently selected from a H, a linear or branched $C_1$-$C_{20}$ alkyl. In structure 3, the acetal structure unit (I) contains a functional group that comprises a nitrogen atom.

The polyvinyl alcohol acetal polymer can have a biodegradability of more than 40%, or more than 50%, or even more than 60% within 60 days, as defined using OECD 301B Ready Biodegradability $CO_2$ Evolution Test Guideline.

The polyvinyl alcohol acetal polymer is present in the composition at a level of from 0.05% to 8.0%, preferably from 0.05% to 5.0%, preferably from 0.1% to 3.5%, more preferably from 0.1% to 2.0% by weight of the composition.

Suitable polyvinyl alcohol starting materials for acetalization are available from various suppliers, including but not limiting to Kuraray, Sekisui, Nippon Gohsei, and Shinetsu, and Sigma Aldrich.

The polyvinyl alcohol acetal polymer is typically manufactured by first polymerizing vinyl acetate monomers and then (typically partially) removing the acetate groups by hydrolysis to obtain a polyvinyl alcohol polymer derivative. This polyvinyl alcohol polymer derivative can then be subsequently post-modified through a reaction with an aldehyde and/or acetal to obtain the polyvinyl alcohol acetal polymer. Within such a post-modification reaction, some of the hydroxyl groups are converted into acetal groups. As such, the polyvinyl alcohol acetal polymer comprises polyvinyl alcohol and polyvinyl acetal subunits. When starting with a partially hydrolyzed polyvinyl alcohol polymer (i.e. having a degree of hydrolysis of less than 100%), the polyvinyl alcohol acetal polymer will further comprise polyvinyl acetate subunits. These polyvinyl alcohol, polyvinyl acetal, and polyvinyl acetate subunits can be organized in blocks or randomly.

The polyvinyl alcohol polymer starting material prior to conversion into a polyvinyl alcohol acetal polymer is preferably a partially hydrolysed homopolymer, i.e. solely comprising polyvinyl acetate and polyvinyl alcohol units, hence excluding further monomer or polymer modifications. As such, the resulting polyvinyl alcohol acetal polymer according to the invention most preferably solely comprises subunits selected from the group consisting of: polyvinyl acetal; polyvinyl acetate; and polyvinyl alcohol.

Detersive surfactant: Preferably, the detersive surfactant comprises anionic detersive surfactant. Preferably, the detersive surfactant comprises alkyl benzene sulphonate.

The composition comprises from 5.0 wt % to 60 wt % detersive surfactant. This surfactant system is an amount sufficient to provide desired cleaning properties. The composition may comprise, by weight of the composition, from 10.0% to 50%, or from 15 wt % to 40 wt % detersive surfactant.

The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

Specific, non-limiting examples of suitable anionic surfactants include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates.

Other useful anionic surfactants can include the alkali metal salts of alkyl benzene sulfonates, in which the alkyl group contains from about 9 to about 15 carbon atoms, in straight chain (linear) or branched chain configuration.

Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB includes high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, for example, a mid-chain branched alkyl sulphate. In one aspect, the mid-chain branches are C1-4 alkyl groups, typically methyl and/or ethyl groups.

Other anionic surfactants useful herein are the water-soluble salts of: paraffin sulfonates and secondary alkane sulfonates containing from about 8 to about 24 (and in some examples about 12 to 18) carbon atoms; alkyl glyceryl ether sulfonates, especially those ethers of C8-18 alcohols (e.g., those derived from tallow and coconut oil). Mixtures of the alkylbenzene sulfonates with the above-described paraffin sulfonates, secondary alkane sulfonates and alkyl glyceryl ether sulfonates are also useful. Further suitable anionic surfactants include methyl ester sulfonates and alkyl ether carboxylates.

The anionic surfactants may exist in an acid form, and the acid form may be neutralized to form a surfactant salt. Typical agents for neutralization include metal counterion bases, such as hydroxides, e.g., NaOH or KOH. Further suitable agents for neutralizing anionic surfactants in their acid forms include ammonia, amines, or alkanolamines. Non-limiting examples of alkanolamines include monoethanolamine, diethanolamine, triethanolamine, and other linear or branched alkanolamines known in the art; suitable alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

The detersive surfactant may comprise a nonionic surfactant. In some examples, the surfactant system comprises up to about 25%, by weight of the surfactant system, of one or more nonionic surfactants, e.g., as a co-surfactant. In some examples, the composition comprises from about 0.1% to about 15%, by weight of the surfactant system, of one or more nonionic surfactants. In further examples, the composition comprises from about 0.3% to about 10%, by weight of the surfactant system, of one or more nonionic surfactants.

Suitable nonionic surfactants useful herein can comprise any conventional nonionic surfactant. These can include, for e.g., alkoxylated fatty alcohols and amine oxide surfactants.

Other non-limiting examples of nonionic surfactants useful herein include: C8-C18 alkyl ethoxylates, such as, NEODOL® nonionic surfactants from Shell; C6-C12 alkyl phenol alkoxylates wherein the alkoxylate units may be ethyleneoxy units, propyleneoxy units, or a mixture thereof; C12-C18 alcohol and C6-C12 alkyl phenol condensates with ethylene oxide/propylene oxide block polymers such as Pluronic® from BASF; C14-C22 mid-chain branched alcohols (BA); C14-C22 mid-chain branched alkyl alkoxylates (BAEx), wherein x is from 1 to 30; alkylpolysaccharides; specifically alkylpolyglycosides; Polyhydroxy fatty acid amides; and ether capped poly(oxyalkylated) alcohol surfactants.

Suitable nonionic detersive surfactants also include alkyl polyglucoside and alkyl alkoxylated alcohol. Suitable nonionic surfactants also include those sold under the tradename Lutensol® from BASF.

The surfactant system may comprise combinations of anionic and nonionic surfactant materials. In some examples, the weight ratio of anionic surfactant to nonionic surfactant is at least about 2:1. In other examples, the weight ratio of anionic surfactant to nonionic surfactant is at least about 5:1. In further examples, the weight ratio of anionic surfactant to nonionic surfactant is at least about 10:1.

The surfactant system may comprise a cationic surfactant. The surfactant system may comprise from about 0% to about 7%, or from about 0.1% to about 5%, or from about 1% to about 4%, by weight of the surfactant system, of a cationic surfactant, e.g., as a co-surfactant. The compositions of the invention may be substantially free of cationic surfactants and surfactants that become cationic below a pH of 7 or below a pH of 6.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, specifically amido propyldimethyl amine (APA).

Suitable cationic detersive surfactants also include alkyl pyridinium compounds, alkyl quaternary ammonium compounds, alkyl quaternary phosphonium compounds, alkyl ternary sulphonium compounds, and mixtures thereof.

Examples of zwitterionic surfactants include: derivatives of secondary and tertiary amines; derivatives of heterocyclic secondary and tertiary amines; and/or derivatives of quaternary ammonium, quaternary phosphonium or tertiary sulfonium compounds. Betaines, including alkyl dimethyl betaine and cocodimethyl amidopropyl betaine, C8 to C18 (for example from C12 to C18) amine oxides and sulfo and hydroxy betaines, such as N-alkyl-N,N-dimethylammino-1-propane sulfonate where the alkyl group can be C8 to C18 and in certain embodiments from C10 to C14.

Examples of amphoteric surfactants include aliphatic derivatives of secondary or tertiary amines, or aliphatic derivatives of heterocyclic secondary and tertiary amines in which the aliphatic radical may be straight- or branched-chain and where one of the aliphatic substituents contains at least about 8 carbon atoms, typically from about 8 to about 18 carbon atoms, and at least one of the aliphatic substituents contains an anionic water-solubilizing group, e.g. carboxy, sulfonate, sulfate. Examples of compounds falling within this definition are sodium 3-(dodecylamino)propionate, sodium 3-(dodecylamino) propane-1-sulfonate, sodium 2-(dodecylamino)ethyl sulfate, sodium 2-(dimethylamino) octadecanoate, disodium 3-(N-carboxymethyldodecylamino)propane 1-sulfonate, disodium octadecyl-imminodiacetate, sodium 1-carboxymethyl-2-undecylimidazole, and sodium N,N-bis(2-hydroxyethyl)-2-sulfato-3-dodecoxypropylamine. Suitable amphoteric surfactants also include sarcosinates, glycinates, taurinates, and mixtures thereof.

Suitable branched detersive surfactants include anionic branched surfactants selected from branched sulphate or branched sulphonate surfactants, e.g., branched alkyl sulphate, branched alkyl alkoxylated sulphate, and branched alkyl benzene sulphonates, comprising one or more random alkyl branches, e.g., C1-4 alkyl groups, typically methyl and/or ethyl groups.

The branched detersive surfactant may be a mid-chain branched detersive surfactant, typically, a mid-chain branched anionic detersive surfactant, for example, a mid-chain branched alkyl sulphate and/or a mid-chain branched alkyl benzene sulphonate. The detersive surfactant can be a mid-chain branched alkyl sulphate. The mid-chain branches can be C1-4 alkyl groups, typically methyl and/or ethyl groups.

Further suitable branched anionic detersive surfactants include surfactants derived from alcohols branched in the 2-alkyl position, such as those sold under the trade names Isalchem®123, Isalchem®125, Isalchem®145, Isalchem®167, which are derived from the oxo process. Due to the oxo process, the branching is situated in the 2-alkyl position. These 2-alkyl branched alcohols are typically in the range of C11 to C14/C15 in length and comprise structural isomers that are all branched in the 2-alkyl position.

Other detergent ingredients: The composition may comprise other detergent ingredients. Suitable detergent ingredients include builders, structurants or thickeners, clay soil removal/anti-redeposition agents, polymeric soil release agents, polymeric dispersing agents, polymeric grease cleaning agents, enzymes, enzyme stabilizing systems, bleaching compounds, bleaching agents, bleach activators, bleach catalysts, brighteners, dyes, hueing agents, dye transfer inhibiting agents, chelating agents, suds supressors, softeners, and perfumes.

Enzymes: The compositions described herein may comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in a composition, the aforementioned additional enzymes may be present at levels from about 0.00001% to about 2%, from about 0.0001% to about 1% or even from about 0.001% to about 0.5% enzyme protein by weight of the composition.

In one aspect preferred enzymes would include a protease. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii*.

(b) trypsin-type or chymotrypsin-type proteases, such as trypsin (e.g., of porcine or bovine origin), including the *Fusarium* protease and the chymotrypsin proteases derived from Cellumonas.

(c) metalloproteases, including those derived from *Bacillus amyloliquefaciens*.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375, DSM 12368, DSMZ no. 12649, KSM AP1378, KSM K36 or KSM K38.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, California) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

In one aspect, such enzymes may be selected from the group consisting of: lipases, including "first cycle lipases". In one aspect, the lipase is a first-wash lipase, preferably a variant of the wild-type lipase from *Thermomyces lanuginosus* comprising one or more of the T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex® and Lipolex®.

In one aspect, other preferred enzymes include microbial-derived endoglucanases exhibiting endo-beta-1,4-glucanase activity (E.C. 3.2.1.4) and mixtures thereof. Suitable endoglucanases are sold under the tradenames Celluclean® and Whitezyme® (Novozymes A/S, Bagsvaerd, Denmark).

Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, California).

Enzyme Stabilizing System: The enzyme-containing compositions described herein may optionally comprise from about 0.001% to about 10%, in some examples from about 0.005% to about 8%, and in other examples, from about 0.01% to about 6%, by weight of the composition, of an enzyme stabilizing system. The enzyme stabilizing system can be any stabilizing system which is compatible with the detersive enzyme. In the case of aqueous detergent compositions comprising protease, a reversible protease inhibitor, such as a boron compound, including borate, 4-formyl phenylboronic acid, phenylboronic acid and derivatives thereof, or compounds such as calcium formate, sodium formate and 1,2-propane diol may be added to further improve stability.

Builders: The compositions of the present invention may optionally comprise a builder. Built compositions typically comprise at least about 1% builder, based on the total weight of the composition. Liquid compositions may comprise up to about 10% builder, and in some examples up to about 8% builder, of the total weight of the composition. Granular compositions may comprise up to about 30% builder, and in some examples up to about 5% builder, by weight of the composition.

Builders selected from aluminosilicates (e.g., zeolite builders, such as zeolite A, zeolite P, and zeolite MAP) and silicates assist in controlling mineral hardness in wash water, especially calcium and/or magnesium, or to assist in the removal of particulate soils from surfaces. Suitable builders may be selected from the group consisting of phosphates, such as polyphosphates (e.g., sodium tri-polyphosphate), especially sodium salts thereof; carbonates, bicarbonates, sesquicarbonates, and carbonate minerals other than sodium carbonate or sesquicarbonate; organic mono-, di-, tri-, and tetracarboxylates, especially water-soluble nonsurfactant carboxylates in acid, sodium, potassium or alkanolammonium salt form, as well as oligomeric or water-soluble low molecular weight polymer carboxylates including aliphatic and aromatic types; and phytic acid. These may be complemented by borates, e.g., for pH-buffering purposes, or by sulfates, especially sodium sulfate and any other fillers or carriers which may be important to the engineering of stable surfactant and/or builder-containing compositions. Additional suitable builders may be selected from citric acid, lactic acid, fatty acid, polycarboxylate builders, for example, copolymers of acrylic acid, copolymers of acrylic acid and maleic acid, and copolymers of acrylic acid and/or maleic acid, and other suitable ethylenic monomers with various types of additional functionalities. Also suitable for use as builders herein are synthesized crystalline ion exchange materials or hydrates thereof having chain structure and a composition represented by the following general anhydride form: $x(M_2O)\cdot ySiO_2\cdot zM'O$ wherein M is Na and/or K, M' is Ca and/or Mg; y/x is 0.5 to 2.0; and z/x is 0.005 to 1.0.

Alternatively, the composition may be substantially free of builder.

Structurant/Thickeners: Suitable structurant/thickeners include:

i. Di-benzylidene Polyol Acetal Derivative
ii. Bacterial Cellulose
iii. Coated Bacterial Cellulose
iv. Cellulose fibers non-bacterial cellulose derived
v. Non-Polymeric Crystalline Hydroxyl-Functional Materials
vi. Polymeric Structuring Agents
vii. Di-amido-gellants
viii. Any combination of above.

Polymeric Dispersing Agents: The composition may comprise one or more polymeric dispersing agents. Examples are carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers such as the compound having the following general structure: $bis((C_2H_5O)(C_2H_4O)n)(CH_3)—N^+—C_xH_{2x}—N^+—(CH_3)-bis((C_2H_5O)(C_2H_4O)n)$, wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. These may comprise alkoxylated polyalkylenimines, for example, having an inner polyethylene oxide block and an outer polypropylene oxide block.

Alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF.

The composition may comprise random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof. A specific example of such graft polymers based on polyalkylene oxides and vinyl esters, in particular vinyl acetate. These polymers are typically prepared by polymerizing the vinyl ester in the presence of the polyalkylene oxide, the initiator used is typically dibenzoyl peroxide, dilauroyl peroxide or diacetyl peroxide.

The composition may comprise blocks of ethylene oxide, propylene oxide. Examples of such block polymers include ethylene oxide-propylene oxide-ethylene oxide (EO/PO/EO) triblock copolymer, wherein the copolymer comprises a first EO block, a second EO block and PO block wherein the first EO block and the second EO block are linked to the PO block. Blocks of ethylene oxide, propylene oxide, butylene oxide can also be arranged in other ways, such as (EO/PO) deblock copolymer, (PO/EO/PO) triblock copolymer. The block polymers may also contain additional butylene oxide (BO) block.

Carboxylate polymer—The composition of the present invention may also include one or more carboxylate polymers such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da.

Soil Release Polymer: The compositions described herein may include from about 0.01% to about 10.0%, typically from about 0.1% to about 5%, or from about 0.2% to about 3.0%, by weight of the composition, of a soil release polymer (also known as a polymeric soil release agents or "SRA").

Soil release polymers typically have hydrophilic segments to hydrophilize the surface of hydrophobic fibers (such as polyester and nylon), and hydrophobic segments to deposit on hydrophobic fibers and remain adhered thereto through completion of washing and rinsing cycles, thereby serving as an anchor for the hydrophilic segments. This may enable stains occurring subsequent to treatment with a soil release agent to be more easily cleaned in later washing procedures. It is also believed that facilitating the release of soils helps to improve or maintain the wicking properties of a fabric.

The structure and charge distribution of the soil release polymer may be tailored for application to different fibers or textile types and for formulation in different detergent or detergent additive products. Soil release polymers may be linear, branched, or star-shaped.

Soil release polymers may also include a variety of charged units (e.g., anionic or cationic units) and/or non-charged (e.g., nonionic) monomer units. Typically, a nonionic SRP may be particularly preferred when the SRP is used in combination with a cationic fabric conditioning active, such as a quaternary ammonium ester compound, in order to avoid potentially negative interactions between the SRP and the cationic active.

Soil release polymer may include an end capping moiety, which is especially effective in controlling the molecular weight of the polymer or altering the physical or surface-active properties of the polymer.

One preferred class of suitable soil release polymers include terephthalate-derived polyester polymers, which comprise structure unit (I) and/or (II):

$$[(OCHR^1—CHR^2)_a—O—OC—Ar—CO\text{-}]_d \quad (I)$$

$$—[(OCHR^3—CHR^4)_b—O—OC\text{-}sAr\text{-}CO\text{-}]_e \quad (II)$$

wherein:

- a, b are from 1 to 200;
- d, e are from 1 to 50;
- Ar is a 1,4-substituted phenylene;
- sAr is 1,3-substituted phenylene substituted in position 5 with $SO_3M$;
- M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;
- $R^1$, $R^2$, $R^3$, $R^4$ are independently selected from H or $C_1$-$C_{18}$ n-alkyl or iso-alkyl;

Optionally, the polymer further comprises one or more terminal group (III) derived from polyalkylene glycolmonoalkylethers, preferably selected from structure (IV-a)

$$—O—[C_2H_4—O]_c—[C_3H_6—O]_d—[C_4H_8—O]_e—R_7 \quad (IV\text{-}a)$$

EP3222647. Where M is a counterion selected from Na, Li, K, Mg/2, Ca/2, Al/3, ammonium, mono-, di-, tri-, or tetraalkylammonium wherein the alkyl groups are C1-C18 alkyl or C2-C10 hydroxyalkyl, or mixtures thereof.

$$—O—CH_2CH_2—SO_3M \quad (IV)$$

(V)

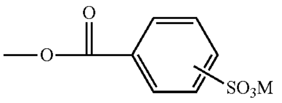

Optionally, the polymer may comprise crosslinking multifunctional structural unit which having at least three functional groups capable of the esterification reaction. The functional which may be for example acid -, alcohol -, ester -, anhydride—or epoxy groups, etc.

Optionally, the polymer may comprise other di- or polycarboxylic acids or their salts or their (di)alkylesters can be used in the polyesters of the invention, such as, naphthalene-1,4-dicarboxylic acid, naphthalene-2,6-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their (C1-$C_4$)-(di)alkyl esters and more preferably their (di)methyl esters, or mixtures thereof.

Preferably, suitable terephthalate-derived soil release polymers are nonionic, which does not comprise above structure (II). A further particular preferred nonionic terephthalate-derived soil release polymer has a structure according to formula below:

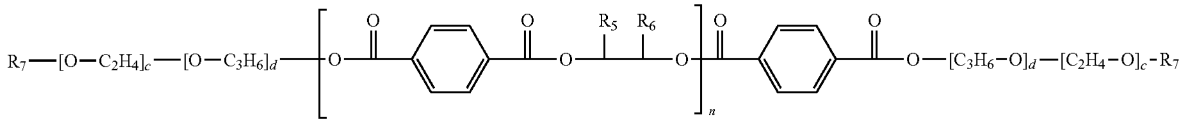

wherein:

- $R_7$ is a linear or branched $C_{1-30}$ alkyl, $C_2$-$C_{30}$ alkenyl, or a cycloalkyl group with 5 to 9 carbon atoms, or a $C_8$-$C_{30}$ aryl group, or a C6-$C_{30}$ arylalkyl group; preferably $C_{1-4}$ alkyl, more preferably methyl; and
- c, d and e are, based on molar average, a number independently selected from 0 to 200, where the sum of c+d+e is from 2 to 500,
- wherein the $[C_2H_4—O]$, $[C_3H_6—O]$ and $[C_4H_8—O]$ groups of the terminal group (IV-a) may be arranged blockwise, alternating, periodically and/or statistically, preferably blockwise and/or statistically, either of the $[C_2H_4—O]$, $[C_3H_6—O]$ and $[C_4H_8—O]$ groups of the terminal group (IV-a) can be linked to $—R_7$ and/or —O.

Optionally, the polymer further comprises one or more anionic terminal unit (IV) and/or (V) as described in wherein:

- $R_5$ and $R_6$ is independently selected from H or $CH_3$. More preferably, one of the $R_5$ and $R_6$ is H, and another is $CH_3$.
- c, d are, based on molar average, a number independently selected from 0 to 200, where the sum of c+d is from 2 to 400,
- More preferably, d is from 0 to 50, c is from 1 to 200,
- More preferably, d is 1 to 10, c is 5 to 150,
- $R_7$ is $C_{1-4}$ alkyl and more preferably methyl,
- n is, based on molar average, from 1 to 50.

One example of most preferred above suitable terephthalate-derived soil release polymers has one of the $R_5$ and $R_6$ is H, and another is $CH_3$; d is 0; c is from 5-100 and $R_7$ is methyl.

Suitable terephthalate-derived soil release polymers may be also described as sulphonated and unsulphonated PET/

POET (polyethylene terephthalate/polyoxyethylene terephthalate) polymers, both end-capped and non-end-capped. Example of suitable soil release polymers include TexCare® polymers, including TexCare® SRA-100, SRA-300, SRN-100, SRN-170, SRN-240, SRN-260, SRN-260 life, SRN-300, and SRN-325, supplied by Clariant.

Other suitable terephthalate-derived soil release polymers are described in patent WO2014019903, WO2014019658 and WO2014019659.

Another class of soil release polymer also include modified cellulose. Suitable modified cellulose may include nonionic modified cellulose derivatives such as cellulose alkyl ether and cellulose hydroxyalkyl ethers. Example of such cellulose alkyl ether and cellulose hydroxyalkyl ethers include methyl cellulose, ethyl cellulose, hydroxyethyl cellulose, hydroxypropyl cellulose, hydroxypropyl methylcellulose, hydroxybutyl methyl cellulose. In some embodiment, the modified cellulose may comprise hydrocarbon of $C_4$ or above, preferred length of the alkyl group maybe $C_4$, $C_6$, $C_8$, $C_{10}$, $C_{12}$, $C_{14}$, $C_{16}$, $C_{18}$; example of suitable modified cellulose are described in WO2019111948 and WO2019111949. In some embodiment, the modified cellulose may comprise additional cationic modification, example of suitable modified cellulose with additional cationic modification are described in WO2019111946 and WO2019111947.

Other examples of commercial soil release polymers are the REPEL-O-TEX® line of polymers supplied by Rhodia, including REPEL-O-TEX® SF, SF-2, and SRP6. Other suitable soil release polymers are Marloquest® polymers, such as Marloquest® SL, HSCB, L235M, B, and G82, supplied by Sasol. Further suitable soil release polymers of a different type include the commercially available material ZELCON 5126 (from DuPont) and MILEASE T (from ICI), Sorez 100 (from ISP).

Cellulosic Polymer: The compositions described herein may include from about 0.1% to about 10%, typically from about 0.5% to about 7%, or from about 3% to about 5%, by weight of the composition, of a cellulosic polymer.

Suitable cellulosic polymers include alkyl cellulose, alkylalkoxyalkyl cellulose, carboxyalkyl cellulose, and alkyl carboxyalkyl cellulose. The cellulosic polymer can be selected from carboxymethyl cellulose, methyl cellulose, methyl hydroxyethyl cellulose, methyl carboxymethyl cellulose, or mixtures thereof. In certain aspects, the cellulosic polymer is a carboxymethyl cellulose having a degree of carboxymethyl substitution of from about 0.5 to about 0.9 and a molecular weight from about 100,000 Da to about 300,000 Da.

Carboxymethylcellulose polymers include Finnfix® GDA (sold by CP Kelko), a hydrophobically modified carboxymethylcellulose, e.g., the alkyl ketene dimer derivative of carboxymethylcellulose sold under the tradename Finnfix® SH1 (CP Kelko), or the blocky carboxymethylcellulose sold under the tradename Finnfix® V (sold by CP Kelko).

Additional Amines: Additional amines may be used in the compositions described herein for added removal of grease and particulates from soiled materials. The compositions described herein may comprise from about 0.1% to about 10%, in some examples, from about 0.1% to about 4%, and in other examples, from about 0.1% to about 2%, by weight of the composition, of additional amines. Non-limiting examples of additional amines may include, but are not limited to, polyamines, oligoamines, triamines, diamines, pentamines, tetraamines, or combinations thereof.

Specific examples of suitable additional amines include tetraethylenepentamine, triethylenetetraamine, diethylenetriamine, or a mixture thereof.

For example, alkoxylated polyamines may be used for grease and particulate removal. Such compounds may include, but are not limited to, ethoxylated polyethyleneimine, ethoxylated hexamethylene diamine, and sulfated versions thereof. Polypropoxylated derivatives may also be included. A wide variety of amines and polyalkyeneimines can be alkoxylated to various degrees. A useful example is 600 g/mol polyethyleneimine core ethoxylated to 20 EO groups per NH and is available from BASF. The compositions described herein may comprise from about 0.1% to about 10%, and in some examples, from about 0.1% to about 8%, and in other examples, from about 0.1% to about 6%, by weight of the composition, of alkoxylated polyamines.

Alkoxylated polycarboxylates may also be used in the compositions herein to provide grease removal. Chemically, these materials comprise polyacrylates having one ethoxy side-chain per every 7-8 acrylate units. The side-chains are of the formula $-(CH_2CH_2O)_m (CH_2)\cdot CH_3$ wherein m is 2-3 and n is 6-12. The side-chains are ester-linked to the polyacrylate "backbone" to provide a "comb" polymer type structure. The molecular weight can vary and may be in the range of about 2000 to about 50,000. The compositions described herein may comprise from about 0.1% to about 10%, and in some examples, from about 0.25% to about 5%, and in other examples, from about 0.3% to about 2%, by weight of the composition, of alkoxylated polycarboxylates.

Bleaching Compounds, Bleaching Agents, Bleach Activators, and Bleach Catalysts: The compositions described herein may contain bleaching agents or bleaching compositions containing a bleaching agent and one or more bleach activators. Bleaching agents may be present at levels of from about 1% to about 30%, and in some examples from about 5% to about 20%, based on the total weight of the composition. If present, the amount of bleach activator may be from about 0.1% to about 60%, and in some examples from about 0.5% to about 40%, of the bleaching composition comprising the bleaching agent plus bleach activator.

Examples of bleaching agents include oxygen bleach, perborate bleach, percarboxylic acid bleach and salts thereof, peroxygen bleach, persulfate bleach, percarbonate bleach, and mixtures thereof.

In some examples, compositions may also include a transition metal bleach catalyst.

Bleaching agents other than oxygen bleaching agents are also known in the art and can be utilized in compositions. They include, for example, photoactivated bleaching agents, or pre-formed organic peracids, such as peroxycarboxylic acid or salt thereof, or a peroxysulphonic acid or salt thereof. A suitable organic peracid is phthaloylimidoperoxycaproic acid. If used, the compositions described herein will typically contain from about 0.025% to about 1.25%, by weight of the composition, of such bleaches, and in some examples, of sulfonate zinc phthalocyanine.

Brighteners: Optical brighteners or other brightening or whitening agents may be incorporated at levels of from about 0.01% to about 1.2%, by weight of the composition, into the compositions described herein. Commercial brighteners, which may be used herein, can be classified into subgroups, which include, but are not necessarily limited to, derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents. In some examples, the fluorescent brightener is selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by Ciba Geigy Corporation), disodium4,4'-bis{[4-anilino-6-(N-2-bis-hydroxyethyl)-s-triazine-2-yl]-amino}-2,2'-stilbene-disulonate (commercially available under the tradename Tinopal UNPA-GX by Ciba-Geigy Corporation), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by Ciba-Geigy Corporation). More preferably, the fluorescent brightener is disodium 4,4'-bis{[4-anilino-6-morpholino-s-triazin-2-yl]-amino}-2,2'-stilbenedisulfonate.

The brighteners may be added in particulate form or as a premix with a suitable solvent, for example nonionic surfactant, monoethanolamine, propane diol.

Fabric Hueing Agents: The compositions may comprise a fabric hueing agent (sometimes referred to as shading, bluing or whitening agents). Typically, the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Dye Transfer Inhibiting Agents: The compositions may also include one or more materials effective for inhibiting the transfer of dyes from one fabric to another during the cleaning process. Generally, such dye transfer inhibiting agents may include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents may be used at a concentration of about 0.0001% to about 10%, by weight of the composition, in some examples, from about 0.01% to about 5%, by weight of the composition, and in other examples, from about 0.05% to about 2% by weight of the composition.

Chelating Agents: The compositions described herein may also contain one or more metal ion chelating agents. Suitable molecules include copper, iron and/or manganese chelating agents and mixtures thereof. Such chelating agents can be selected from the group consisting of phosphonates, amino carboxylates, amino phosphonates, succinates, polyfunctionally-substituted aromatic chelating agents, 2-pyridinol-N-oxide compounds, hydroxamic acids, carboxymethyl inulins, and mixtures therein. Chelating agents can be present in the acid or salt form including alkali metal, ammonium, and substituted ammonium salts thereof, and mixtures thereof.

The chelant may be present in the compositions disclosed herein at from about 0.005% to about 15% by weight, about 0.01% to about 5% by weight, about 0.1% to about 3.0% by weight, or from about 0.2% to about 0.7% by weight, or from about 0.3% to about 0.6% by weight of the composition.

Aminocarboxylates useful as chelating agents include, but are not limited to ethylenediaminetetracetates (EDTA); N-(hydroxyethyl)ethylenediaminetriacetates (HEDTA); nitrilotriacetates (NTA); ethylenediamine tetraproprionates; triethylenetetraaminehexacetates, diethylenetriamine-pentaacetates (DTPA); methylglycinediacetic acid (MGDA); Glutamic acid diacetic acid (GLDA); ethanoldiglycines; triethylenetetraaminehexaacetic acid (TTHA); N-hydroxyethyliminodiacetic acid (HEIDA); dihydroxyethylglycine (DHEG); ethylenediaminetetrapropionic acid (EDTP) and derivatives thereof.

Encapsulates: The compositions may comprise an encapsulate. In some aspects, the encapsulate comprises a core, a shell having an inner and outer surface, where the shell encapsulates the core.

In certain aspects, the encapsulate comprises a core and a shell, where the core comprises a material selected from perfumes; brighteners; dyes; insect repellants; silicones; waxes; flavors; vitamins; fabric softening agents; skin care agents, e.g., paraffins; enzymes; anti-bacterial agents; bleaches; sensates; or mixtures thereof; and where the shell comprises a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts, or mixtures thereof. The shell may comprise an aminoplast, the aminoplast comprises polyurea, polyurethane, and/or polyureaurethane. The polyurea may comprise polyoxymethyleneurea and/or melamine formaldehyde.

Liquid laundry detergent composition. The laundry detergent composition can be a liquid laundry detergent composition. Suitable liquid laundry detergent compositions can comprise a non-soap surfactant, wherein the non-soap surfactant comprises an anionic non-soap surfactant and a non-ionic surfactant. The laundry detergent composition can comprise from 10% to 60%, or from 20% to 55% by weight of the laundry detergent composition of the non-soap surfactant. The weight ratio of non-soap anionic surfactant to nonionic surfactant is typically from 1:1 to 20:1, from 1.5:1 to 17.5:1, from 2:1 to 15:1, or from 2.5:1 to 13:1. Suitable non-soap anionic surfactants include linear alkylbenzene sulphonate, alkyl sulphate or a mixture thereof. The weight ratio of linear alkylbenzene sulphonate to alkyl sulphate can be from 1:2 to 9:1, from 1:1 to 7:1, from 1:1 to 5:1, or from 1:1 to 4:1. Suitable linear alkylbenzene sulphonates are C10-C16 alkyl benzene sulfonic acids, or C11-C14 alkyl benzene sulfonic acids. Suitable alkyl sulphate anionic surfactants include alkoxylated alkyl sulphates, non-alkoxylated alkyl sulphates, and mixture thereof. Preferably, the HLAS surfactant comprises greater than 50% C12, preferably greater than 60%, preferably greater than 70% C12, more preferably greater than 75% C12. Suitable alkoxylated alkyl sulphate anionic surfactants include ethoxylated alkyl sulphate anionic surfactants. Suitable alkyl sulphate anionic surfactants include ethoxylated alkyl sulphate anionic surfactant with a mol average degree of ethoxylation of from 1 to 5, from 1 to 3, or from 2 to 3. The alkyl alkoxylated sulfate may have a broad alkoxy distribution or a peaked alkoxy distribution. The alkyl portion of the AES may include, on average, from 13.7 to about 16 or from 13.9 to 14.6 carbons atoms. At least about 50% or at least about 60% of the AES molecule may include having an alkyl portion having 14 or more carbon atoms, preferable from 14 to 18, or from 14 to 17, or from 14 to 16, or from 14 to 15 carbon atoms. The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. The alkyl fraction of the alkyl sulphate anionic surfactant can be derived from fatty alcohols, oxo-synthesized alcohols, Guerbet alcohols, or mixtures thereof. Preferred alkyl sulfates include optionally ethoxylated alcohol sulfates including 2-alkyl branched primary alcohol sulfates especially 2-branched C12-15 primary alcohol sulfates, linear primary alcohol sulfates especially linear C12-14 primary alcohol sulfates, and mixtures thereof. The laundry detergent composition can comprise from 10% to 50%, or from 15% to 45%, or from 20% to 40%, or from 30% to 40% by weight of the laundry detergent composition of the non-soap anionic surfactant.

Suitable non-ionic surfactants can be selected from alcohol broad or narrow range alkoxylates, an oxo-synthesised alcohol alkoxylate, Guerbet alcohol alkoxylates, alkyl phenol alcohol alkoxylates, or a mixture thereof. The laundry detergent composition can comprise from 0.01% to 10%, from 0.01% to 8%, from 0.1% to 6%, or from 0.15% to 5% by weight of the liquid laundry detergent composition of a non-ionic surfactant.

The laundry detergent composition comprises from 1.5% to 20%, or from 2% to 15%, or from 3% to 10%, or from 4% to 8% by weight of the laundry detergent composition of soap, such as a fatty acid salt. Such soaps can be amine neutralized, for instance using an alkanolamine such as monoethanolamine.

The laundry detergent composition can comprises an adjunct ingredient selected from the group comprising builders including citrate, enzymes, bleach, bleach catalyst, dye, hueing dye, Leuco dyes, brightener, cleaning polymers including alkoxylated polyamines and polyethyleneimines, amphiphilic copolymers, soil release polymer, surfactant, solvent, dye transfer inhibitors, chelant, diamines, perfume, encapsulated perfume, polycarboxylates, structurant, pH trimming agents, antioxidants, antibacterial, antimicrobial agents, preservatives and mixtures thereof.

The laundry detergent composition can have a pH of from 2 to 11, or from 6.5 to 8.9, or from 7 to 8, wherein the pH of the laundry detergent composition is measured at a 10% product concentration in demineralized water at 20° C.

The liquid laundry detergent composition can be Newtonian or non-Newtonian, preferably non-Newtonian.

For liquid laundry detergent compositions, the composition can comprise from 5% to 99%, or from 15% to 90%, or from 25% to 80% by weight of the liquid detergent composition of water.

The detergent composition according to the invention can be liquid laundry detergent composition. The following are exemplary liquid laundry detergent formulations. Preferably the liquid laundry detergent composition comprises from between 0.1% and 4.0%, preferably between 0.5% and 3%, more preferably between 1% to 2.5% by weight of the detergent composition of the sulfatized esteramine according to the invention.

| Raw Material | Comp. 1 % wt | Comp. 2 % wt | Comp. 3 % wt | Comp. 4 % wt |
|---|---|---|---|---|
| Branched Alkyl Sulfate | 0.0 | 5.3 | 0.0 | 5.3 |
| Sodium Lauryl Sulfate | 0.0 | 3.0 | 0.0 | 3.0 |
| Linear alkylbenzene sulfonate | 18.0 | 5.0 | 6.0 | 5.0 |
| AE3S Ethoxylated alkyl sulphate with an average degree of ethoxylation of 3 | 5.0 | 0.0 | 1.3 | 0.0 |
| C25AES Ethoxylated alkyl sulphate with an average degree of ethoxylation of 2.5[1] | 0.0 | 3.0 | 1.4 | 0.0 |
| Amine oxide | 0.7 | 1.0 | 0.4 | 0.8 |
| C24 alkyl ethoxylate (EO7) | 8.4 | 0.0 | 12.9 | 5.0 |
| C24 alkyl ethoxylate (EO9) | 0.0 | 8.7 | 0.0 | 3.7 |
| C45 alkyl ethoxylate (EO7) | 0.0 | 2.7 | 0.0 | 2.7 |
| Citric acid | 2.9 | 2.3 | 0.7 | 2.3 |
| Palm kernel fatty acid | 0.0 | 1.0 | 0.0 | 1.0 |
| Topped kernel fatty acid | 2.9 | 0.0 | 2.3 | 0.0 |
| Mannanase | 0.0017 | 0.0017 | 0.0017 | 0.0017 |
| Pectawash | 0.00342 | 0.00342 | 0.00342 | 0.00342 |
| Amylase | 0.00766 | 0.00766 | 0.00766 | 0.00766 |
| Protease | 0.07706 | 0.07706 | 0.07706 | 0.07706 |
| Nuclease[3] | 0.010 | 0.01 | 0.01 | 0.01 |
| Sodium tetraborate | 0.0 | 1.7 | 0.0 | 1.7 |
| MEA-Boric Acid Salt | 0.0 | 0.0 | 0.8 | 0.0 |
| Calcium/sodium formate | 0.0 | 0.04 | 0.01 | 0.04 |
| Sodium/Calcium Chloride | 0.04 | 0.02 | 0.03 | 0.02 |
| Ethoxylated polyethyleneimine[2] | 0.0 | 2.0 | 1.1 | 2.0 |
| Amphiphilic graft copolymer | 1.5 | 0.0 | 0.0 | 0.0 |
| Ethoxylated-Propoxylated polyethyleneimine | 0.0 | 2.0 | 0.8 | 2.0 |
| Zwitterionic polyamine | 0.5 | 0.0 | 0.0 | 0.0 |
| Nonionic polyester terephthalate | 1.0 | 1.0 | 1.0 | 1.0 |
| Polymer of the present invention | 1.0 | 2.0 | 1.5 | 2.5 |
| DTPA | 0.0 | 0.1 | 0.2 | 0.1 |
| EDDS | 0.1 | 0.0 | 0.0 | 0.0 |
| GLDA | 0.4 | 0.3 | 0.1 | 0.0 |
| MGDA | 0.2 | 0.0 | 0.0 | 0.5 |
| Diethylene triamine penta(methyl phosphonic) acid (DTPMP) | 1.1 | 0.0 | 0.0 | 0.0 |

-continued

| Raw Material | Comp. 1 % wt | Comp. 2 % wt | Comp. 3 % wt | Comp. 4 % wt |
|---|---|---|---|---|
| Fluorescent Brightener[8] | 0.06 | 0.22 | 0.03 | 0.15 |
| Ethanol | 0.7 | 1.9 | 0.0 | 1.9 |
| propylene glycol | 5.5 | 5.5 | 0.33 | 5.5 |
| Sorbitol | 0.01 | 0.01 | 0.0 | 0.01 |
| Monoethanolamine | 0.2 | 0.2 | 0.6 | 0.2 |
| DETA | 0.1 | 0.08 | 0.0 | 0.08 |
| Antioxidant 1 | 0.0 | 0.1 | 0.1 | 0.1 |
| Antioxidant 2 | 0.1 | 0.0 | 0.0 | 0.0 |
| Hygiene Agent | 0.0 | 0.0 | 0.05 | 0.0 |
| NaOH | 4.7 | 4.7 | 1.1 | 4.7 |
| NaCS | 3.2 | 1.7 | 3.2 | 1.7 |
| Hydrogenated Castor Oil | 0.2 | 0.1 | 0.12 | 0.1 |
| Aesthetic dye | 0.10 | 0.01 | 0.006 | 0.01 |
| Leuco dye | 0.05 | 0.01 | 0.0 | 0.01 |
| Perfume | 2.0 | 1.3 | 0.5 | 1.3 |
| Perfume microcapsules | 0.5 | 0.05 | 0.1 | 0.05 |
| Silicone antifoam[7] | 0.02 | 0.01 | 0.0 | 0.01 |
| Phenyloxyethanol | 0.002 | 0.01 | 0.0 | 0.01 |
| Hueing dye | 0.01 | 0.1 | 0.05 | 0.1 |
| Water & miscellaneous | balance | balance | balance | balance |

1 C12-15EO2.5S AlkylethoxySulfate where the alkyl portion of AES includes from about 13.9 to 14.6 carbon atoms 2 PE-20 commercially available from BASF 3 Nuclease enzyme is as claimed in co-pending European application 19219568.3

4 Antioxidant 1 is 3,5-bis(1,1-dimethylethyl)-4-hydroxy-benzenepropanoic acid, methyl ester [6386-38-5]

5 Antioxidant 2 is Tinogard TS commercially available from BASF

6 Hygiene Agent is agent is Tinosan HP 100 commercially available from BASF

7 Dow Corning supplied antifoam blend 80-92% ethylmethyl, methyl(2-phenyl propyl)siloxane;

5-14% MQ Resin in octyl stearate a 3-7% modified silica.

8 Fluorescent Brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt.

Water soluble unit dose article.

The laundry detergent composition can be a water-soluble unit dose article. The water-soluble unit dose article comprises at least one water-soluble film orientated to create at least one unit dose internal compartment, wherein the at least one unit dose internal compartment comprises a detergent composition. The water-soluble film preferably comprises polyvinyl alcohol homopolymer or polyvinyl alcohol copolymer, for example a blend of polyvinylalcohol homopolymers and/or polyvinylalcohol copolymers, for example copolymers selected from sulphonated and carboxylated anionic polyvinylalcohol copolymers especially carboxylated anionic polyvinylalcohol copolymers, for example a blend of a polyvinylalcohol homopolymer and a carboxylated anionic polyvinylalcohol copolymer. In some examples water soluble films are those supplied by Monosol under the trade references M8630, M8900, M8779, M8310. The detergent product comprises a detergent composition, more preferably a laundry detergent composition. Preferably the laundry detergent composition enclosed in the water-soluble unit dose article comprises from between 0.1% and 8%, preferably between 0.5% and 7%, more preferably 1.0% to 6.0% by weight of the detergent composition of the sulfatized esteramine of the present invention. Preferably the soluble unit dose laundry detergent composition comprises a non-soap surfactant, wherein the non-soap surfactant comprises an anionic non-soap surfactant and a non-ionic surfactant. More preferably, the laundry detergent composition comprises between 10% and 60%, or between 20% and 55% by weight of the laundry detergent composition of the non-soap surfactant. The weight ratio of non-soap anionic surfactant to nonionic surfactant preferably is from 1:1 to 20:1, from 1.5:1 to 17.5:1, from 2:1 to 15:1, or from 2.5:1 to 13:1. The non-soap anionic surfactants preferably comprise linear alkylbenzene sulphonate, alkyl sulphate or a mixture thereof. The weight ratio of linear alkylbenzene sulphonate to alkyl sulphate preferably is from 1:2 to 9:1, from 1:1 to 7:1, from 1:1 to 5:1, or from 1:1 to 4:1. Example linear alkylbenzene sulphonates are C10-C16 alkyl benzene sulfonic acids, or C11-C14 alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactants comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. Preferably the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. Preferably, the laundry detergent composition comprises between 0.01% and 10%, or between 0.01% and 8%, or between 0.1% and 6%, or between 0.15% and 5% by weight of the liquid laundry detergent composition of a non-ionic surfactant. Preferably, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine preferably monoethanolamine. Preferably the liquid laundry detergent composition comprises less than 15%, or less than 12% by weight of the liquid laundry detergent composition of water. Preferably, the laundry detergent composition comprises between 10% and 40%, or between 15% and 30% by weight of the liquid laundry detergent composition of a non-aqueous solvent selected from 1,2-propanediol, dipropylene glycol, tripropyleneglycol, glycerol, sorbitol, polyethylene glycol or a mixture thereof. Preferably the liquid laundry detergent composition comprises from 0.1% to 10%, preferably from 0.5% to 8% by weight of the detergent composition of further soil release polymers, preferably selected from the group of nonionic and/or anionically modified polyester terephthalate soil release polymers such as commercially available under the Texcare brand name from Clariant, amphiphilic graft polymers such as those based on polyalkylene oxides and vinyl esters, polyalkoxylated polyethyleneimines, and mixtures thereof. Preferably the liquid detergent composition further comprises from 0.1% to 10% preferably from 1% to 5% of a chelant. In some examples, the laundry detergent composition comprises an adjunct ingredient selected from the group comprising builders including citrate, enzymes, bleach, bleach catalyst, dye, hueing dye, brightener, cleaning polymers including (zwitterionic) alkoxylated polyamines, surfactant, solvent, dye transfer inhibitors, perfume, encapsulated perfume, polycarboxylates, structurant, pH trimming agents, and mixtures thereof. Preferably, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian, preferably non-Newtonian.

The following is an exemplary water soluble unit dose formulations. The composition can be part of a single chamber water soluble unit dose article or can be split over multiple compartments resulting in below "averaged across compartments" full article composition. The composition is enclosed within a polyvinyl alcohol based water soluble, the polyvinyl alcohol comprising ablend of a polyvinyl alcohol homopolymer and an anionic e.g. carboxylated polyvinyl alcohol copolymer.

| Ingredients | Comp (wt %) |
|---|---|
| Fatty alcohol ethoxylate non-ionic surfactant, $C_{12-14}$ average degree of ethoxylation of 7 | 3.8 |
| Lutensol XL100 | 0.5 |
| Linear $C_{11-14}$ alkylbenzene sulphonate | 24.6 |
| AE3S Ethoxylated alkyl sulphate with an average degree of ethoxylation of 3 | 12.5 |
| Citric acid | 0.7 |
| Palm Kernel Fatty acid | 5.3 |
| Nuclease enzyme* (wt % active protein) | 0.01 |
| Protease enzyme (wt % active protein) | 0.07 |
| Amylase enzyme (wt % active protein) | 0.005 |
| Xyloglucanese enzyme (wt % active protein) | 0.005 |
| Mannanase enzyme (wt % active protein) | 0.003 |
| Ethoxylated polyethyleneimine (Lutensol FP620 - PEI600EO20) | 1.4 |
| Amphiphilic graft copolymer** | 1.6 |
| Zwitterionic polyamine (Lutensit Z96) | 1.5 |
| Anionic polyester terephthalate (Texcare SRA300) | 0.6 |
| Polymer of the present invention | 3.0 |
| HEDP | 2.2 |
| Brightener 49 | 0.4 |
| Silicone anti-foam | 0.3 |
| Hueing dye | 0.05 |
| 1,2 PropaneDiol | 11.0 |
| Glycerine | 4.7 |
| DPG (DiPropyleneGlycol) | 1.7 |
| TPG (TriPropyleneGlycol) | 0.1 |
| Sorbitol | 0.1 |
| Monoethanolamine | 10.2 |
| $K_2SO_3$ | 0.4 |
| $MgCl_2$ | 0.3 |
| water | 10.5 |
| Hydrogenated castor oil | 0.1 |
| Perfume | 2.1 |
| Aesthetic dye & Minors | Balance to 100 |
| pH (10% product concentration in demineralized water at 20° C.) | 7.4 |

*Nuclease enzyme is as claimed in co-pending European application 19219568.3

**polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Solid free-flowing particulate laundry detergent composition. The laundry detergent composition can be solid free-flowing particulate laundry detergent composition. The following is an exemplary solid free-flowing particulate laundry detergent composition.

| Ingredient | Comp. (wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.1 wt % to 4 wt % |
| Cationic detersive surfactant (such as quaternary ammonium compounds) | from 0 wt % to 4 wt % |
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid and/or carboxylate polymers comprising ether moieties and sulfonate moieties) | from 0.1 wt % to 4 wt % |
| Polyethylene glycol polymer (such as a polyethylene glycol polymer comprising polyvinyl acetate side chains) | from 0 wt % to 4 wt % |
| Polyester soil release polymer (such as Repel-o-tex and/or Texcare polymers) | from 0 wt % to 2 wt % |
| Cellulosic polymer (such as carboxymethyl cellulose, methyl cellulose and combinations thereof) | from 0.5 wt % to 2 wt % |
| Polymer of the present invention | From 0.1 wt % to 4 wt % |

-continued

| Ingredient | Comp. (wt %) |
|---|---|
| Other polymer (such as care polymers) | from 0 wt % to 4 wt % |
| Zeolite builder and phosphate builder (such as zeolite 4A and/or sodium tripolyphosphate) | from 0 wt % to 4 wt % |
| Other co-builder (such as sodium citrate and/or citric acid) | from 0 wt % to 3 wt % |
| Carbonate salt (such as sodium carbonate and/or sodium bicarbonate) | from 0 wt % to 20 wt % |
| Silicate salt (such as sodium silicate) | from 0 wt % to 10 wt % |
| Filler (such as sodium sulphate and/or bio-fillers) | from 10 wt % to 70 wt % |
| Source of hydrogen peroxide (such as sodium percarbonate) | from 0 wt % to 20 wt % |
| Bleach activator (such as tetraacetylethylene diamine (TAED) and/or nonanoyloxybenzenesulphonate (NOBS)) | from 0 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Photobleach (such as zinc and/or aluminium sulphonated phthalocyanine) | from 0 wt % to 0.1 wt % |
| Chelant (such as ethylenediamine-N'N'-disuccinic acid (EDDS) and/or hydroxyethane diphosphonic acid (HEDP)) | from 0.2 wt % to 1 wt % |
| Hueing agent (such as direct violet 9, 66, 99, acid red 50, solvent violet 13 and any combination thereof) | from 0 wt % to 1 wt % |
| Brightener (C.I. fluorescent brightener 260 or C.I. fluorescent brightener 351) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0 wt % to 0.2 wt % |
| Cellulase (such as Carezyme and/or Celluclean) | from 0 wt % to 0.2 wt % |
| Lipase (such as Lipex, Lipolex, Lipoclean and any combination thereof) | from 0 wt % to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 15 wt % |
| Flocculant (such as polyethylene oxide) | from 0 wt % to 1 wt % |
| Suds suppressor (such as silicone and/or fatty acid) | from 0 wt % to 4 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance to 100 wt % |

The following are embodiments of the present invention.

1. A laundry detergent composition comprising:

(a) from 5.0 wt % to 60 wt % detersive surfactant; and (b) from 0.05 wt % to 8.0 wt % polyvinyl alcohol acetal polymer, wherein the polyvinyl alcohol acetal polymer has a structure comprising the structural units (I), (II) and (III):

(I)

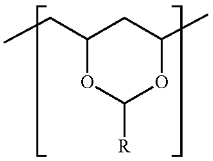

(II)

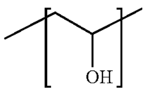

-continued (III)

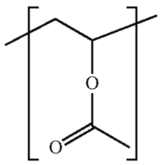

wherein R is selected from alkyl, alkenyl, hydroxyalkyl, hydroxyalkenyl, aryl, alkyl aryl, alkenyl aryl, aryl alkyl, aryl alkenyl, and any derivative thereof.

2. The composition according to embodiment 1, wherein the polyvinyl alcohol acetal polymer has the structure such that R is alkyl or a derivative thereof.

3. The composition according to any preceding embodiment, wherein the polyvinyl alcohol acetal polymer has a structure such that R is aryl or a derivative thereof.

4. The composition according to any preceding embodiment, wherein the polyvinyl alcohol acetal polymer has a structure such that R is phenyl or a derivative thereof.

5. The composition according to any preceding embodiment, wherein the polyvinyl alcohol acetal polymer has a structure such that R is substituted with a functional group comprising a heteroatom.

6. The composition according to any preceding embodiment, wherein the polyvinyl alcohol acetal polymer has an average degree of acetal substitution expressed as mol % of from 0.5% to 10%.

7. The composition according to any preceding embodiment, wherein the polyvinyl alcohol acetal polymer has an average degree of acetate substitution expressed as mol % of from 5% to 25%.

8. The composition according to any preceding embodiment, wherein the polyvinyl alcohol acetal polymer has an average degree of hydroxyl substitution expressed as mol % of from 60% to 95%.

9. The composition according to any preceding embodiment, wherein the composition comprises from 0.1 wt % to 3.5 wt % polyvinyl alcohol acetal polymer.

10. The composition according to any preceding embodiment, wherein the composition comprises from 10 wt % to 40 wt % detersive surfactant.

11. The composition according to any preceding embodiment, wherein the detersive surfactant comprises anionic detersive surfactant.

12. The composition according to any preceding embodiment, wherein the detersive surfactant comprises alkyl benzene sulphonate.

13 The composition according to any preceding embodiment, wherein the polyvinyl alcohol acetal polymer has a biodegradability of more than 40% within 60 days, as defined using OECD 301B Ready Biodegradability $CO_2$ Evolution Test Guideline.

14. The composition according to any preceding embodiment, wherein the polyvinyl alcohol acetal polymer has a structure that consists essentially only of the structural units (I), (II) and (III).

15. The composition according to any preceding embodiment, wherein the polyvinyl alcohol acetal polymer has an average viscosity of from 1 mPa·s to 100 mPa·s, when measured as a 4% aqueous solution in de-mineralised water at 20° C.

Test methods: The following are suitable test methods for the present invention.

Test Method 1: Method for Evaluating Whiteness Performance of Polymers. Whiteness maintenance, also referred to as whiteness preservation, is the ability of a detergent to keep white items from whiteness loss when they are washed in the presence of soils. White garments can become dirty/dingy looking over time when soils are removed from dirty clothes and suspended in the wash water, then these soils can re-deposit onto clothing, making the clothing less white each time they are washed. The whiteness benefit of inventive polymers is evaluated using automatic Miniwasher with 5 pots. SBL2004 test soil strips supplied by WFK Testgewebe GmbH are used to simulate consumer soil levels (mix of body soil, food, dirt, grass etc.). On average, every 1 SBL2004 strip is loaded with 8 g soil. White Fabric swatches of Table below purchased from WFK Testgewebe GmbH are used as whiteness tracers. Before wash test, L, a, b values of all whiteness tracers are measured using a Konica Minolta CM-3610D spectrophotometer.

White Fabric Swatches

| Code | % Fiber Content | Fiber Construction | Fabric Density (g/m) | Whiteness Index (WI) A* | Whiteness Index (WI) D65** | Size |
|---|---|---|---|---|---|---|
| Cotton Terry | 100 | Woven | ~540 | ~93 | ~163 | 8" × 8" (20 × 20 cm) |
| Cotton Knit | 100 | Weft Knit | ~220 | ~96 | ~165 | 8" × 8" (20 × 20 cm) |
| Polyester/Cotton | 65/35 | Plain Woven | ~125 | ~98 | ~156 | 8" × 8" (20 × 20 cm) |
| Polyester | 100 | Weft Knit | ~200 | ~95 | ~156 | 8" × 8" (20 × 20 cm) |
| Cotton/Spandex | 98/2 | Woven Twill | ~180 | ~86 | ~158 | 8" × 8" (20 × 20 cm) |

*WI(A)—illuminant A (indoor lighting)
**WI(D65)—illuminant D65 (outdoor lighting)

Three cycles of wash are needed to complete the test:

Cycle 1: desired amount of detergent is fully dissolved by mixing with 7.57 L water (at defined hardness) in each Miniwasher tube. 4.0 SBL2004 strips (~32 g of soil) and 3 whiteness tracers (internal replicate) of each fabric type are washed and rinsed in the Miniwasher under defined conditions, then dried.

Cycle 2: The above whiteness tracers are washed again with new set of 5SBL2004 sheet, and dried. All other conditions remain same as cycle 1.

Cycle 3: The above whiteness tracers are washed again with new set of SBL2004 sheet, and dried. All other conditions remain same as cycle 1.

After Cycle 3, all whiteness tracers are dried and then measured again using Konica Minolta CM-3610D spectrophotometer. The changes in Whiteness Index (ΔWI(CIE)) are calculated based on L, a, b measure before and after wash:

$$\Delta WI(CIE) = WI(CIE)(\text{after wash}) - WI(CIE)(\text{before wash}).$$

Miniwasher have 5 pots, 5 products can be tested in one test. In a typical polymer whiteness performance test, one reference product contains no polymer is tested together with 4 products containing inventive polymer as disclosed herein, and "ΔWI versus reference" is reported.

$$\Delta WI(CIE)\ \text{versus reference} = \Delta WI(CIE)(\text{product}) - \Delta WI(CIE)(\text{reference})$$

Test Method 2: Biodegradability test. The biodegradability of the polyvinyl alcohol acetal polymer was determined following the OECD 301B Ready Biodegradability CO2 Evolution Test Guideline. In this study, the test substance is the sole carbon and energy source and under aerobic conditions microorganisms metabolize the test substance producing CO2 or incorporating the carbon into biomass. The amount of CO2 produced by the test substance (corrected for the CO2 evolved by the blank inoculum) is expressed as a percentage of the theoretical amount of CO2 (ThCO2) that could have been produced if the organic carbon in the test substance was completely converted to CO2.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Examples

Polyvinyl Alcohol Acetal Polymer Synthesis

Polyvinyl alcohol acetal polymers were synthesised using the procedure below:

A 10 wt % aqueous solution of polyvinyl alcohol (Sigma Aldrich, 3 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of the respective reactive aldehyde (amount depending on targeted degree of acetalization), as indicated in Table 3, and the beaker was closed with a lid. The mixture was stirred at room temperature for 12 to 24 hours. The reaction mixture was brought back to a pH of 6-7 using an aqueous sodium hydroxide solution (1 M). The resulting reaction mixture was poured into a freeze dryer tray, diluted with 1 L of additional demineralized water and placed into the freezer. Once the mixture was frozen, it was placed into the freeze dryer. Freeze drying yielded a white polymer containing residual salts. Inventive polymer Examples 2, 3, 4, 7, 8, 9, 10 and 28 are made through this approach, using the respective amount of reactive aldehyde.

Inventive Polymer Example 6 (2.9 Mole % Hexanal Acetal)

A 10 wt % aqueous solution of polyvinyl alcohol (Sigma Aldrich, 3.2 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. This solution was added to a 3-neck round bottom flask, equipped with a reflux condenser, stir bar and septa. Under stirring, the solution was heated to 80° C. 2.1 mL of 12 M hydrochloric acid solution was diluted with 5 mL DI water and syringed into the hot solution, followed by addition of 1.76 mL hexanal. The mixture was stirred for 4 h at 80° C. Afterwards, the heat was turned off and the solution was allowed to cool down to room temperature and stirred for 65 h. The reaction mixture was brought back to a pH 6-7 using 69 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. Inventive polymer Example 5 is also made through a similar approach, adjusting the amount of hexanal used and the amount of aqueous sodium hydroxide solution if needed.

Inventive Polymer Example 15 (2.4 Mole % Benzaldehyde Acetal)

A 10 wt % aqueous solution of polyvinyl alcohol (Sigma Aldrich, 3.2 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 1.21 mL benzaldehyde, and the beaker was closed with a lid and covered with aluminum foil. The mixture was stirred at room temperature for 20 hours. The reaction mixture was brought back to a pH 7 using 33.2 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. Inventive polymer Examples 11, 12, 13 and 14 are also made through a similar approach, adjusting the amount of benzaldehyde used and the amount of aqueous sodium hydroxide solution if needed. Inventive polymer Examples 25, 26 and 27 are also made through a similar approach, using the respective amount of 2-ethyl hexanal and benzaldehyde as reactive aldehydes and adjusting the amount of aqueous sodium hydroxide solution if needed.

Inventive Polymer Example 16 (2.1 Mole % 2-Ethyl Hexanal Acetal)

A 10 wt % aqueous solution of polyvinyl alcohol (Sigma Aldrich, 3.2 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 1.5 mL 2-ethyl hexanal, and the beaker was closed with a lid. The mixture was stirred at room temperature for 18 hours. The reaction mixture was brought back to a pH 6-7 using 31.7 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. Inventive polymer Examples 17 and 18 are also made through a similar approach, adjusting the amount of 2-ethyl hexanal used and the amount of aqueous sodium hydroxide solution if needed.

Inventive Polymer Example 19 (2.5 Mole % Hexanal Acetal and 1.1 Mole % Tert. Amine Acetal)

A 10 wt % aqueous solution of polyvinyl alcohol (Sigma Aldrich, 3.0 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 1.2 mL hexanal, and the beaker was closed with a lid. The mixture was stirred at room temperature for 24 hours. Afterwards, 0.4 mL of 12 M hydrochloric acid solution was added, followed by addition of 1.05 mL 4-(dimethylamino)butyraldehyde diethyl acetal. The solution was stirred for another 20 hours. The reaction mixture was brought back to a pH 6-7 using 41 mL of an aqueous sodium hydroxide solution (1 M). The resulting reaction mixture was precipitated into acetone and the polymer was filtered off. The polymer was placed in a vacuum oven at 70° C. for 24 hours. Drying yielded a white polymer containing residual salts. Inventive polymer Example 20 is also made through a similar approach, using 1.5 mL octanal instead of hexanal and adjusting the amount of aqueous sodium hydroxide solution if needed.

Inventive Polymer Example 21 (2.1 Mole % Tert. Amine Acetal)

A 10 wt % aqueous solution of polyvinyl alcohol (Sigma Aldrich, 3.0 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 3.0 mL of 12 M hydrochloric acid solution was added to reach a solution pH of 1, followed by addition of 2.6 mL 4-(dimethylamino)butyraldehyde diethyl acetal, and the beaker was closed with a lid. The mixture was stirred at room temperature for 18 hours. The reaction mixture was brought back to a pH 6-7 using 34 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts.

Inventive Polymer Example 24 (2.4 Mole % Butyraldehyde/Octanal Acetal Mixture)

A 10 wt % aqueous solution of polyvinyl alcohol (Sigma Aldrich, 3.0 cP for a 4% aqueous solution in demineralized water at 20° C., 80% degree of hydrolysis) was prepared by placing 225 g of demineralized water into a beaker, covering it with a lid, heating the water to 50° C. and adding 25 g of the polyvinyl alcohol incrementally while stirring. Once the polymer was fully dissolved and a homogeneous solution was obtained, the heat was turned off and the solution was allowed to cool down to room temperature. To this cooled down solution, 2.1 mL of 12 M hydrochloric acid solution was added, followed by addition of 0.64 mL butyraldehyde and 0.62 mL octanal, and the beaker was closed with a lid. The mixture was stirred at room temperature for 20 hours. The reaction mixture was brought back to a pH 6-7 using 31 mL of an aqueous sodium hydroxide solution (1 M). The resulting reaction mixture was poured into a freeze dryer tray, diluted with additional 1 L of demineralized water and placed into the freezer. Once the mixture was frozen, it was placed into the freeze dryer. Freeze drying yielded a white polymer containing residual salts. Inventive polymer Example 23 is also made through a similar approach, using 0.63 mL hexanal instead of butyraldehyde and adjusting the amount of aqueous sodium hydroxide solution if needed.

TABLE 1

Reactive aldehydes and acetals used to make polyvinyl alcohol acetal polymer (supplied by Sigma Aldrich[1] or TCI[2]):

| Polymer type | Reactive moiety |
|---|---|
| A | Butyraldehyde[1] |
| B | Hexanal[1] |
| C | Heptanal[1] |
| D | Octanal[1] |
| E | Decanal[1] |
| F | Benzaldehyde[1] |
| G | 2-Ethyl hexanal[1] |
| H | 4-(Dimethylamino)butyraldehyde Diethyl Acetal[1,2] |

The degree of acetalization was increased by increasing the amount of reactive aldehyde or acetal added to the above reaction mixture, to achieve degrees of acetalization of from 0% (polyvinyl alcohol homopolymer) up to 8.5% by mol. The average degree of acetalization of the resulting PVAcetal polymer was determined by $^1H$ NMR spectroscopy. $^1H$ NMR spectra were recorded at 25±0.2° C. using a Bruker AVANCE III 300 MHz Spectrometer, equipped with a broad band observe probe with Z-gradient. 25-30 mg of polyvinyl alcohol acetal polymer was dissolved in 0.7-0.8 mL of DMSO-$d_6$ and a clear solution was obtained with most polyvinyl alcohol acetal polymer polymers. In case the polyvinyl alcohol acetal polymer polymer was not fully dissolved in DMSO-$d_6$, methanol-$d_4$ was used as an alternative deuterated solvent. Polymer Type H was characterized using $D_2O$ as deuterated solvent. $^1H$ NMR spectra were processed using MestReNova 14.1 software. The calculation of average degree of acetalization expressed in mole % was determined, based on the integrated chemical shift signals from the $^1H$ NMR spectrum (300 MHz) using the peak assignments as indicated in Table 2.

TABLE 2

Chemical shift assignment and integration ranges of the different NMR peaks as a function of the type of acetalization and the solvent used to dissolve the polyvinyl alcohol acetal polymer.

| | Chemical shift [ppm] | | | | | | |
|---|---|---|---|---|---|---|---|
| | DMSO-$d_6$ | | | | | | |
| Chemical group | Polymer Type A | Polymer Type B, C, D, E | Polymer Type G | Polymer Type F | Polymer Type H/B or H/D mixtures | $D_2O$ Polymer Type H | Methanol-$d_4$ Polymer Type A, B, C, D, E |
| —CH3 of acetal | 0.79-0.93 | 0.78-0.92 | 0.73-0.92 | NA | 0.78-0.92 | NA | 0.82-1.00 |
| —C6H5 of acetal | NA | NA | NA | 7.25-7.48 | NA | NA | NA |
| —CH of acetal | NA | NA | NA | 5.42-5.59 | NA | NA | |
| —CH2 next to N | NA | NA | NA | NA | 2.11-2.20 | 3.11-3.25 | |
| —N(CH3)2 | NA | NA | NA | NA | 2.06-2.11 | 2.86-2.915 | |
| —CH2— of polymer backbone and —CH2— of acetal | 0.93-1.87 | 0.92-1.87 | 0.92-1.87 | 0.92-1.87 | 0.92-1.87 | 1.12-2.05 | 1.00-1.96 |
| —CH3 of acetate | 1.87-2.06 | 1.87-2.06 | 1.87-2.06 | 1.87-2.06 | 1.87-2.06 | 2.05-2.2 | 1.96-2.11 |

The structure of inventive polymers are summarized in Table 3. All polymers were synthesized using a polyvinyl alcohol polymer from Sigma Aldrich with a viscosity of 3.0-3.2 cP at 4% aqueous solution in demineralized water at 20° C. and a 79.1-79.6% degree of hydrolysis.

TABLE 3

Properties of inventive polymer examples.

| Inventive polymer Examples | Polymer type (according to Table 1) | Degree of hydroxyl substitution (mol % ) | Degree of acetate substitution (mol %) | Degree of acetal substitution (mol %) |
|---|---|---|---|---|
| 2 | A | 75.1 | 19.4 | 5.5 |
| 3 | B | 78.0 | 20.0 | 2.0 |
| 4 | B | 79.1 | 18.2 | 2.7 |
| 5 | B | 90.0 | 8.0 | 2.0 |
| 6 | B | 88.7 | 8.3 | 2.9 |
| 7 | C | 78.4 | 19.4 | 2.1 |
| 8 | D | 79.5 | 18.5 | 1.9 |
| 9 | D | 78.5 | 19.6 | 2.0 |
| 10 | E | 78.4 | 19.5 | 2.1 |
| 11 | F | 80.0 | 19.0 | 1.0 |
| 12 | F | 80.6 | 18.0 | 1.4 |
| 13 | F | 79.7 | 18.5 | 1.8 |
| 14 | F | 78.8 | 19.0 | 2.2 |
| 15 | F | 79.0 | 18.7 | 2.4 |
| 16 | G | 78.8 | 19.0 | 2.1 |
| 17 | G | 78.8 | 18.9 | 2.3 |
| 18 | G | 76.9 | 20.1 | 3.0 |
| 19 | B/H mixture | 77.6 | 18.8 | 2.5 B/1.1 H |
| 20 | D/H mixture | 78.1 | 18.5 | 2.2 B/1.1 H |
| 21 | H | 77.1 | 20.8 | 2.1 |
| 23 | B/D mixture | 77.9 | 20.1 | 2.1 |
| 24 | A/D mixture | 77.6 | 20.0 | 2.4 |
| 25 | G/F mixture | 79.0 | 18.6 | 1.05 G/0.78 F |
| 26 | G/F mixture | 77.9 | 18.9 | 1.56 G/0.90 F |
| 27 | G/F mixture | 75.8 | 19.8 | 1.30 G/ 1.74 F |
| 28 | B | 74.5 | 21.3 | 4.2 |

Example 1: Whiteness Maintenance Performance of Liquid Detergent Compositions Comprising Polyvinyl Alcohol Acetal Polymer Liquid detergents below are prepared by traditional means known to those of ordinary skill in the art by mixing the listed ingredients.

| | Comparative | Inventive |
|---|---|---|
| Detergent Ingredient | A | B |
| Sodium Lauryl Sulfate (%) | 11.09 | 11.09 |
| C24EO9 (%) | 7.58 | 7.58 |
| C12/14 Amine Oxide (%) | 1.88 | 1.88 |
| C1218 Fatty acid (%) | 2.95 | 2.95 |
| Silicone (%) | 0.005 | 0.005 |
| NaOH (%) | 1.64 | 1.64 |
| Sodium Tetraborate (%) | 0.96 | 0.96 |
| Citric Acid (%) | 2.45 | 2.45 |
| Solvent (1,2-Propylene glycol) (%) | 11.89 | 11.89 |
| Ethanol (%) | 0.82 | 0.82 |
| Enzymes (%) | 0.08 | 0.08 |
| Sodium Formate (%) | 0.07 | 0.07 |
| Perfume (%) | 0.45 | 0.45 |
| Inventive polymer Example 1 (%) | 0.00 | 2.60 |
| Water | Balance | Balance |

The whiteness maintenance performance of formulation comparative composition A, inventive composition B are evaluated according to the whiteness method, result summarized below. Inventive polymer can provide significant improvement on whiteness performance compare with comparative composition A.

| Inventive polymer | ΔWI(CIE) versus reference on PE (100% polyester knit) |
|---|---|
| Example 2 | 12.22 |
| Example 3 | 12.08 |
| Example 4 | 4.30 |
| Example 5 | 3.90 |
| Example 6 | 4.97 |
| Example 7 | 7.52 |
| Example 8 | 3.92 |
| Example 9 | 7.96 |
| Example 10 | 2.90 |
| Example 11 | 9.53 |
| Example 12 | 12.35 |
| Example 13 | 13.15 |
| Example 15 | 14.1 |
| Example 16 | 8.64 |
| Example 17 | 4.79 |
| Example 18 | 5.07 |
| Example 19 | 6.38 |
| Example 20 | 4.43 |
| Example 21 | 5.68 |
| Example 23 | 6.33 |
| Example 24 | 10.55 |
| Example 25 | 6.97 |
| Example 26 | 10.05 |
| Example 27 | 8.82 |

Biodegradation Test Results

The biodegradability of inventive polymers was determined by following the OECD 301B Ready Biodegradability $CO_2$ Evolution Test Guideline. In this study, the test substance is the sole carbon and energy source and under aerobic conditions microorganisms metabolize the test substance producing $CO_2$ or incorporating the carbon into biomass. The amount of $CO_2$ produced by the test substance (corrected for the $CO_2$ evolved by the blank inoculum) is expressed as a percentage of the theoretical amount of $CO_2$ ($ThCO_2$) that could have been produced if the organic carbon in the test substance was completely converted to $CO_2$.

TABLE 4

Biodegradation Test Results

| Polymer | % $ThCO_2$ evolution at 60 Days |
|---|---|
| Inventive polymer 3 | 87.2 ± 1.1 |
| Inventive polymer 28 | 77.0 ± 5.0 |
| Inventive polymer 15 | 73.6 ± 2.7 |
| Inventive polymer 21 | 84.2 ± 4.3 |

The biodegradation test results (Table 4) show the materials have degraded extensively, reaching by >60% $ThCO_2$ evolution at 60 days.

What is claimed is:

1. A laundry detergent composition comprising:

(a) from about 5.0 wt % to about 60 wt % detersive surfactant; and (b) from about 0.05 wt % to about 8.0 wt % of a polyvinyl alcohol acetal polymer, wherein the polyvinyl alcohol acetal polymer has a structure comprising the structural units (I), (II) and (III):

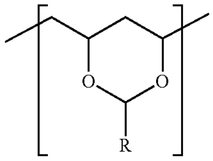

(I)

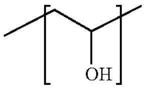

(II)

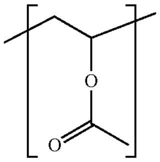

(III)

wherein R is aryl, phenyl, substituted with a functional group comprising a heteroatom, or derivatives thereof.

2. The composition according to claim 1, wherein the polyvinyl alcohol acetal polymer has an average degree of acetal substitution expressed as mol % of from about 0.5% to about 10%.

3. The composition according to claim 1, wherein the polyvinyl alcohol acetal polymer has an average degree of acetate substitution expressed as mol % of from about 5% to about 25%.

4. The composition according to claim 1, wherein the polyvinyl alcohol acetal polymer has an average degree of hydroxyl substitution expressed as mol % of from about 60% to about 95%.

5. The composition according to claim 1, wherein the composition comprises from about 0.1 wt % to about 3.5 wt % polyvinyl alcohol acetal polymer.

6. The composition according to claim 1, wherein the composition comprises from about 10 wt % to about 40 wt % detersive surfactant.

7. The composition according to claim 1, wherein the detersive surfactant comprises anionic detersive surfactant.

8. The composition according to claim 1, wherein the detersive surfactant comprises alkyl benzene sulphonate.

9. The composition according to claim 1, wherein the polyvinyl alcohol acetal polymer has a biodegradability of more than about 40% within 60 days, as defined using OECD 301B Ready Biodegradability $CO_2$ Evolution Test Guideline.

10. The composition according to claim 1, wherein the structure consists essentially of the structural units (I), (II) and (III).

11. The composition according to claim 1, wherein the polyvinyl alcohol acetal polymer has an average viscosity of from about 1 mPa·s to about 100 mPa·s, when measured as a 4% aqueous solution in de-mineralised water at 20° C.

12. A laundry detergent composition comprising:

(a) from about 5.0 wt % to about 60 wt % detersive surfactant; and (b) from about 0.05 wt % to about 8.0 wt % of a polyvinyl alcohol acetal polymer, wherein the polyvinyl alcohol acetal polymer has a structure comprising the structural units (I), (II) and (III):

(I)

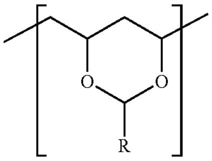

(II)

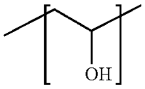

(III)

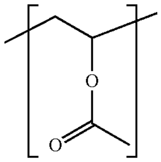

wherein R is aryl, phenyl, substituted with a functional group comprising a heteroatom, or derivatives thereof, wherein the polyvinyl alcohol acetal polymer has an average degree of acetal substitution expressed as mol % of from about 0.5% to about 10%, an average degree of acetate substitution expressed as mol % of from about 5% to about 25%, and an average degree of hydroxyl substitution expressed as mol % of from about 60% to about 95%.

13. The composition according to claim 12, wherein the structure consists essentially of the structural units (I), (II) and (III).

* * * * *